(12) United States Patent
Kim et al.

(10) Patent No.: US 7,785,020 B2
(45) Date of Patent: Aug. 31, 2010

(54) OPTICAL COMPONENT AND TRANSCEIVER PACKAGING

(75) Inventors: Daehwan Daniel Kim, Sunnyvale, CA (US); Mark J. Donovan, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/840,315

(22) Filed: Aug. 17, 2007

(65) Prior Publication Data

US 2009/0010600 A1 Jan. 8, 2009

Related U.S. Application Data

(60) Provisional application No. 60/948,395, filed on Jul. 6, 2007.

(51) Int. Cl.
G02B 6/36 (2006.01)
H04B 10/00 (2006.01)

(52) U.S. Cl. .............................. 385/92; 385/88; 398/135
(58) Field of Classification Search ................. 398/135; 385/88, 92
See application file for complete search history.

(56) References Cited

U.S. PATENT DOCUMENTS

| 5,469,526 | A | * | 11/1995 | Rawlings | ................... | 385/135 |
|---|---|---|---|---|---|---|
| 5,943,461 | A | * | 8/1999 | Shahid | ........................ | 385/92 |
| 6,058,235 | A | * | 5/2000 | Hiramatsu et al. | .......... | 385/135 |
| 6,224,268 | B1 | * | 5/2001 | Manning et al. | .............. | 385/56 |
| 6,263,143 | B1 | * | 7/2001 | Potteiger et al. | ............ | 385/135 |
| 6,503,336 | B1 | * | 1/2003 | Barr | ............................ | 134/34 |
| 2007/0031100 | A1 | * | 2/2007 | Garcia et al. | ................. | 385/135 |

* cited by examiner

*Primary Examiner*—Uyen-Chau N Le
*Assistant Examiner*—John M Bedtelyon
(74) *Attorney, Agent, or Firm*—Workman Nydegger

(57) ABSTRACT

Methods of packaging a high density optical module. In one example embodiment, a method of packaging the high density optical module includes various acts. First, a first detachable fiber assembly is connected to an optical component disposed in the module such that the connection between the fiber assembly and the optical component is disposed inside a housing of the optical module. Next, the fiber included in the fiber assembly is spooled around a spooling assembly. Then, the receptacle is secured in a receptacle holder such that the receptacle is able to connect with an external fiber connector. Next, the fiber assembly is detached from the optical component. Finally, the optical component is heated such that a ball grid array connection, that connects the optical component to a high speed printed circuit board, flows such that the optical component can be removed from the high speed printed circuit board.

7 Claims, 7 Drawing Sheets

OPTICAL COMPONENT AND TRANSCEIVER PACKAGING

CROSS-REFERENCE TO RELATED APPLICATIONS

This application claims the benefit of U.S. Provisional Patent Application Ser. No. 60/948,395, filed Jul. 6, 2007 and entitled OPTICAL COMPONENT AND TRANSCEIVER PACKAGING, which application is incorporated by reference in its entirety.

BACKGROUND OF THE INVENTION

1. The Field of the Invention

The present invention relates to optical modules such as optical transceivers and optical transponders. More specifically, the present invention relates to methods and systems for packaging a high speed optical component in an optical transceiver or an optical transponder.

2. The Relevant Technology

Optical modules including optical transceivers and optical transponders are used in a variety of applications including telecommunication and network applications. Optical modules often provide several advantages. For instance, optical signals are capable of high speeds compared to wired networks and are less susceptible to electromagnetic interference. Nonetheless, there is a continuous desire to produce optical modules that are increasingly smaller without sacrificing data transfer rates and reliability. In fact, there is usually an effort to increase the data rates in the same or smaller sized packages.

As a general rule, however, the complexity of the layout and arrangement of module components in an optical module increases as speed requirements become higher. As a result, it becomes more difficult to overcome the technological hurdles that accompany higher speeds. There are several areas, for example, where problems associated with higher speeds become more pronounced and difficult to overcome. These problems present significant technological difficulties that can prevent the high speeds from being achieved using conventional techniques. For instance, the functionality of high speed modules can be adversely impacted by capacitances, impedance mismatches, inductive connections, trace lengths, trace layout, solder joints, and the like or any combination thereof The list of issues associated with high speeds does not end here, however. Electromagnetic interference (EMI) emissions, size constraints, the number of connections, and the like are other concerns that need to be considered when contemplating high speed modules.

Another problem facing the development and production of high speed and/or high density optical modules relates to the ability to adequately interact with components of a transceiver or other optical module without damaging other components of the transceiver or optical module. For example, conventional modules are often constructed in a manner that prevents any particular component from being easily tested, replaced, and/or repaired once the module is fully assembled. In some instances, attempts to replace a component in a module often causes damage to other components within the module. As a result, it is typically easier to simply replace the entire module. This can increase costs and often makes if difficult to identify problems or trends. More specifically, many of the components included in an optical module are sensitive and can be damaged rather easily. Further, some types of connections such as bond wires and chip pins cannot be easily repaired or cannot be replaced without substantial costs in terms at least of time and money.

There is a need for a method of arranging the components of the transceiver such that the components or subcomponents can be easily tested, replaced, and/or repaired. There is also a need for modules that can overcome some of the existing problems that hinder the development of higher speed optical modules.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

These and other limitations are overcome by embodiments of the invention which relate to systems and methods for optical packaging. The architecture provides an optical packaging system that can be used to generate different products using the same architecture. Embodiments of the invention also enable a module to be evaluated, repaired, etc., in a manner that can be achieved at the component level.

In one example embodiment, a high density optical module has at least one of a receiving optical assembly and a transmitting optical assembly. A method of packaging the high density optical module includes various acts. First, a first detachable fiber assembly is connected to an optical component disposed in the module such that the connection between the fiber assembly and the optical component is disposed inside a housing of the optical module. The fiber assembly includes a receptacle, a fiber, and a modified connector, and the optical component includes one of a TOSA, a ROSA, a laser, a photodiode, an optical isolator, or a polarizer. Next, the fiber included in the fiber assembly is spooled around a spooling assembly. Then, the receptacle is secured in a receptacle holder such that the receptacle is able to connect with an external fiber connector. Next, the fiber assembly is detached from the optical component. Finally, the optical component is heated such that a ball grid array connection, that connects the optical component to a high speed printed circuit board, flows such that the optical component can be removed from the high speed printed circuit board without damaging the fiber assembly.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate generally to an optical module. The systems, methods, and architectures described herein can be used in various optical systems and solutions including, by way of example only, optical transceivers and optical transponders. The optical module described herein includes an architecture and layout that reduces or eliminates some of the problems found in conventional systems and architectures.

Advantageously, embodiments of the invention include an optical module that has replaceable components, an increased density of connections and or signal density, component protection, scalability for additional components, and the like or any combination thereof The architecture disclosed herein enables high density integrated circuit (IC) packaging. For example, ball grid array (BGA) and fiber pig-tails can be used in transceiver and transponder applications. In one example, a BGA component inside of a module is adapted to include a receptacle for receiving an optical fiber. The receptacle can be connected with a short fiber length, such as a pig-tail, that provides an interface to an external optical fiber. Thus, the pig-tail becomes a patch cord inside of the module. This provides several advantages including structural advantages.

For instance, embodiments of the invention include a fiber jumper or an internal fiber that is detachable or removable from components within the module. The detachability or removability of the fiber jumper facilitates the change-out of other components. The use of BGA further simplifies the change-out of a component inside a module. For example, a modularized TOSA or ROSA can be disconnected from the fiber jumper and then replace as a modular component.

Figure 1:
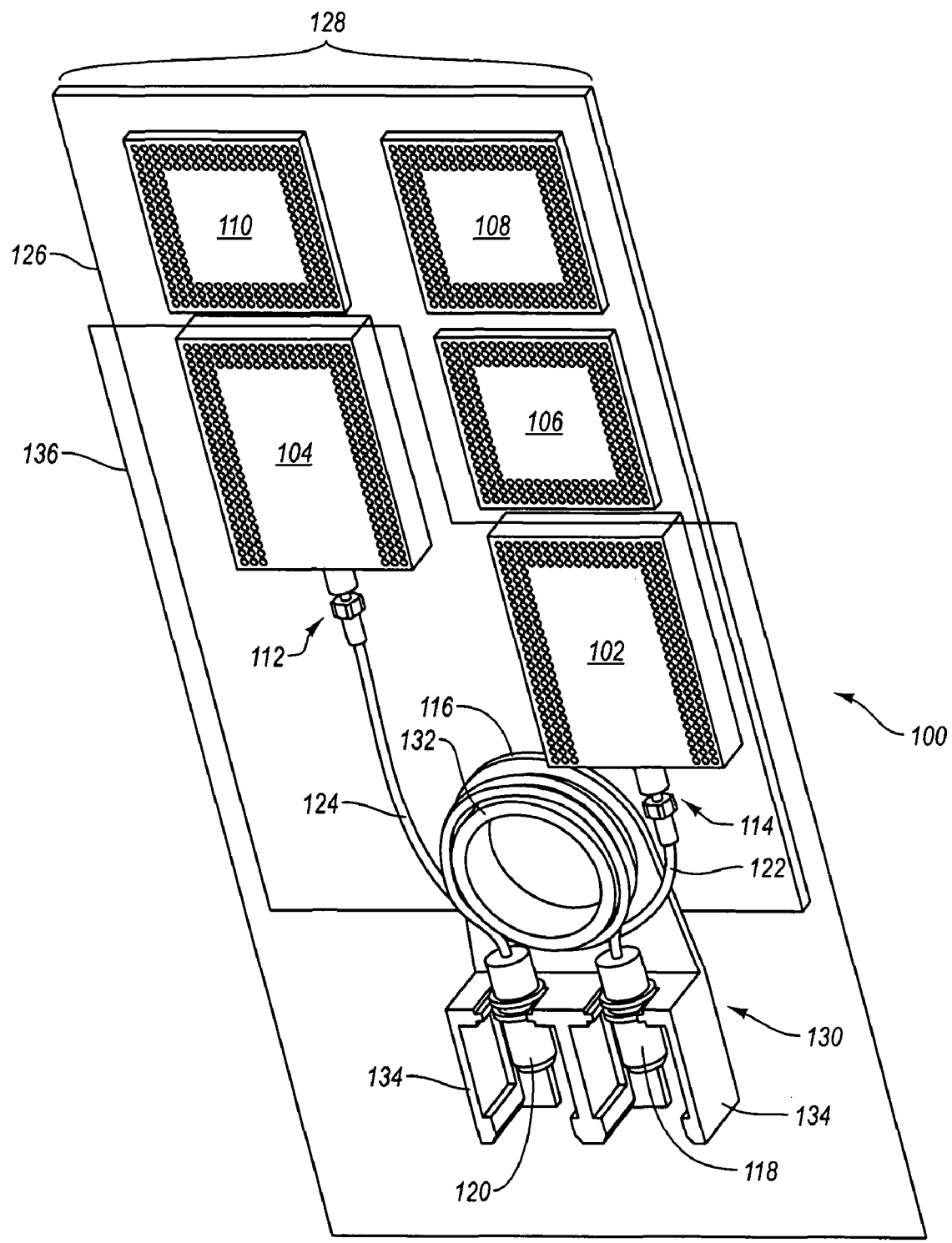
FIG. 1 illustrates a perspective view of one embodiment of an optical component and its packaging.

FIG. 1 illustrates an embodiment of an optical module. The optical module 100 illustrated in FIG. 1 can be embodied as an optical transceiver, an optical transponder, as a modular replacement component for another optical module and the like. Thus, the optical module 100 may be an optical transceiver, an optical transponder, an optical receiver and/or optical transmitter and the like. The module 100 is preferably configured for use in high speed optical communications, including by way of example only, 40 G, 50 G, 100 G transmission speeds. Embodiments of the invention, however, may be used in conjunction with other transmission speeds, both higher and lower.

The module 100 includes a printed circuit board (PCB) 126, which is typically enclosed in a housing. The housing is typically configured to comply with a standard (e.g., SFP, SFP+, XFP, MAUI, GBIC etc.). FIG. 1 also illustrate the modules prior to being connected to the PCB 126. Thus, each module illustrates examples of a ball grid array (BGA) type connection that is described in more detail below. However, during fabrication, these modules are turned over such that the balls of solder align with corresponding pads on the PCB. The solder is then flowed to connect the modules to the PCB 126. In this manner, the components are connected mechanically and electrically with the PCB. Additional material may be added to insure a stronger mechanical connection in some instances.

In this example, the PCB 126 includes an electrical interface 128 that is configured to removably connect with a host device. The module 100 may therefore be pluggable, including hot-pluggable, in a host device. When the module 100 is configured as an optical transceiver, for example, it can both receive and transmit data. The transmission of data by the module 100 therefore begins with electrical data that is converted to optical form. For example, the module 100 receives electrical input from a host or other device over the interface 128. The electrical input is processed and ultimately transmitted as optical data over the transmit port.

Similarly, the reception of data begins with optical data that is converted to electrical form. The module 100 receives optical input via the port 120, processes the optical input and then provides a host with the electrical equivalent at the interface 128.

The receiver portion of the module 100 includes the receptacle 120 (or port), the fiber 124, the modified connector 112, the component 104 (or other optical module), and serializer/deserializer (SERDES) 110. The SERDES 110, and the component 104 (or the ROSA 104 in this example) are mounted to the PCB 126 using, in one embodiment, a ball grid array (BGA). The BGA enables high density mounting of integrated circuits and other components on a PCB. The ROSA 104, and SERDES 110 are electrically connected to each other and with a host device via the PCB 126. The use of a BGA conserves space on the PCB and enables the impedances, EMI emissions, and the like to be better controlled because the transmission of high speed electrical signals are confined within modules and or to the traces on the PCB 126. Further, the BGA configuration allows more connections to be placed on the PCB 126 or within the module 100. As a result, the additional complexity associated with higher speeds can be better handled by the increased connections. A BGA configuration can allow hundreds of connections on the PCB 126, in contrast to convention connections.

The ROSA 104 receives optical input over the fiber 124 which includes a receptacle 120 on one end and a modified connector 112 on the other side. The modified connector 112 connects with the ROSA 104 while the receptacle 120 interfaces with another connector that is external to the module 100. In one example, the receptacle 120 is configured as an LC or as an SC receptacle that can detachably connect with an LC or SC connector. One of skill in the art can appreciate that other form factors may be used for the receptacle 120.

In this example, the ROSA 104 can be completely contained inside of the housing of the module 100. The optical connection with an external fiber is achieved using a fiber jumper assembly or fiber pig-tail. The fiber assembly may include the receptacle 120, a fiber 124, and a modified connector 112 or any combination thereof This arrangement of a fiber assembly provides several advantages. For instance, EMI emissions can be better contained because both the housing of the ROSA 104 (or of the TOSA 102) can be designed to contain EMI in addition to the containment provided by the housing of the module 100.

Further, the fiber assembly can be detached from the ROSA 104 via the connector 112. By disconnecting the connector 112 from the ROSA 104, the ball grid array (BGA) connecting the ROSA 104 to the PCB 126 allows the ROSA 104 to be changed-out without damaging the fiber assembly. More particularly, by heating the BGA after disconnecting the fiber assembly, the ROSA 104 can be removed as an individual component of the module 100. The ROSA 104 can then be tested, replaced, repaired, etc., separately from the module 100. The BGA enables the same ROSA 104 or a new ROSA 104 to be reattached to the PCB 126. After the ROSA is reattached (for example by heating the BGA such that the solder flows), the connector 112 is again connected with the ROSA 104. Further, because the fiber 124 can be disconnected from the ROSA 104, the fiber is less likely to be damaged by the heat required to disconnect the module 104 and is less likely to be damaged.

In conventional modules, the fibers are typically directly attached to the OSA. As a result, the ability to change out an OSA such as the ROSA or TOSA may result in damage to the fiber.

The ability to detach the fiber assembly allows the ROSA or TOSA assembly to be changed out, tested, repaired, and the like without the same risk to the fiber assembly. Further, embodiments of the invention enable the module 100 to adapt from one type of external connection to another by changing out a fiber assembly and/or a spool assembly. Thus, the same module could be changed from LC to SC, for example.

An additional benefit achieved by this flexibility is that different product families can be generated using a similar PCB layout. By selecting the appropriate parts, different products can be manufactured in a cost effective manner. For example, modules with an LC interface can be generated as well as modules with an SC interface. In this case, a different fiber assembly or a different fiber pigtail is selected. The architecture described herein enables a particular transceiver or transponder to be adapted in terms of form factor, makes components replaceable, repairable, etc., and streamlines manufacturing processes.

Another advantage of this configuration relates to the cost of the module. If the fiber is damaged during operation, repair, component replacement, etc., it is only necessary to replace the fiber assembly. In contrast, in cases where the fiber assembly is not detachable from the ROSA 104, it may be necessary to replace the entire ROSA when only the fiber is damaged. Alternatively, various modules can also be replaced in a cost effective manner as described herein.

The transmitter side of the module 100 is similarly configured. The TOSA 102 (or other component) can be connected to an external fiber via the fiber assembly that includes the receptacle 118, the fiber 122, and the modified connector 114. The connector 114 is also detachable from the TOSA 102, which enables the TOSA 102 to be removed, replaced, evaluated, similarly to how the ROSA is removed, replaced, evaluated, etc. In operation, an electrical signal is received over the interface 128 by the SERDES 108. The SERDES 108 provides an output electrical signal to the TOSA driver 106. The TOSA 102 is driven by the TOSA driver 106 to produce a modulated optical signal that is transmitted via the fiber 122 and out the receptacle 118. The receptacle 118 is typically configured to detachably interface with, by way of example only, an LC or RC connector.

The module 100 may include a connection assembly 130, which may include a spool assembly 116. The spool assembly 116 may be an integrated part of the connection assembly 130 or be a connectable part of the connection assembly 130. In this example, the fiber 122 and the fiber 124 are wrapped around the spool assembly 116 in various manners. For instance, the fibers 122 and 124 may wrap around the spool assembly 116 less than one revolution, one revolution, or more than one revolution. In addition, one of the fibers 122 and 124 may spool more than the other fiber.

The spool assembly 116 may include a ridge 132 that provides a guide for wrapping the fibers. The ridge 132 may be formed to prevent the fibers from slipping off of the spool assembly 116. In addition, the ridge 132 may have a diameter that is related to a bend radius of the fibers 122 and 124. In one embodiment, the fibers 122 and 124 have a high bend radius on the order of a 7.5 mm bend radius. Other fibers with a smaller or larger bend radius may also be used. However, the bend radius selected is typically selected such that light does not escape from the fiber when wrapped around the spool assembly 116. Using fibers that can be more tightly spooled on the spool assembly 116 ensures that the spool assembly 116 consumes less of the space that may be available in any given module 100. The spool assembly 116 may further have a dividing ridge that ensures that the spooled fibers 122 and 124 do not overlap. This dividing ridge may be formed to keep one fiber on a top portion of the spool assembly 116 and the other fiber on a bottom portion of the spool assembly 116. Alternatively, the two fibers 122 and 124 may overlap in any manner.

The connection assembly 130 also includes receptacle holders 134. The receptacle holders 134 are typically sized and shaped to receive an optical connector such as an LC or SC connector. The receptacles 118 and 120 can then align with fibers when connected with a corresponding connector. One advantage of the fiber assembly is that components such as the ROSA 104 and the TOSA 102 can be easily connected with test equipment via the receptacles 118 and 120. For example, the TOSA 102 can be tested prior in a test module prior to the fabrication of the module.

Often, the connection assembly 130 is integrated to reduce components. Thus, the receptacle holders 134 and the spool assembly 116 are a single piece that can be mounted to the housing of the module 100 and/or to the PCB 126.

In one embodiment a low cost Tx/Rx such as a transceiver can be produced. One embodiment of a low cost transceiver would include the various components described herein illustrated within the line 136.

Figure 2:
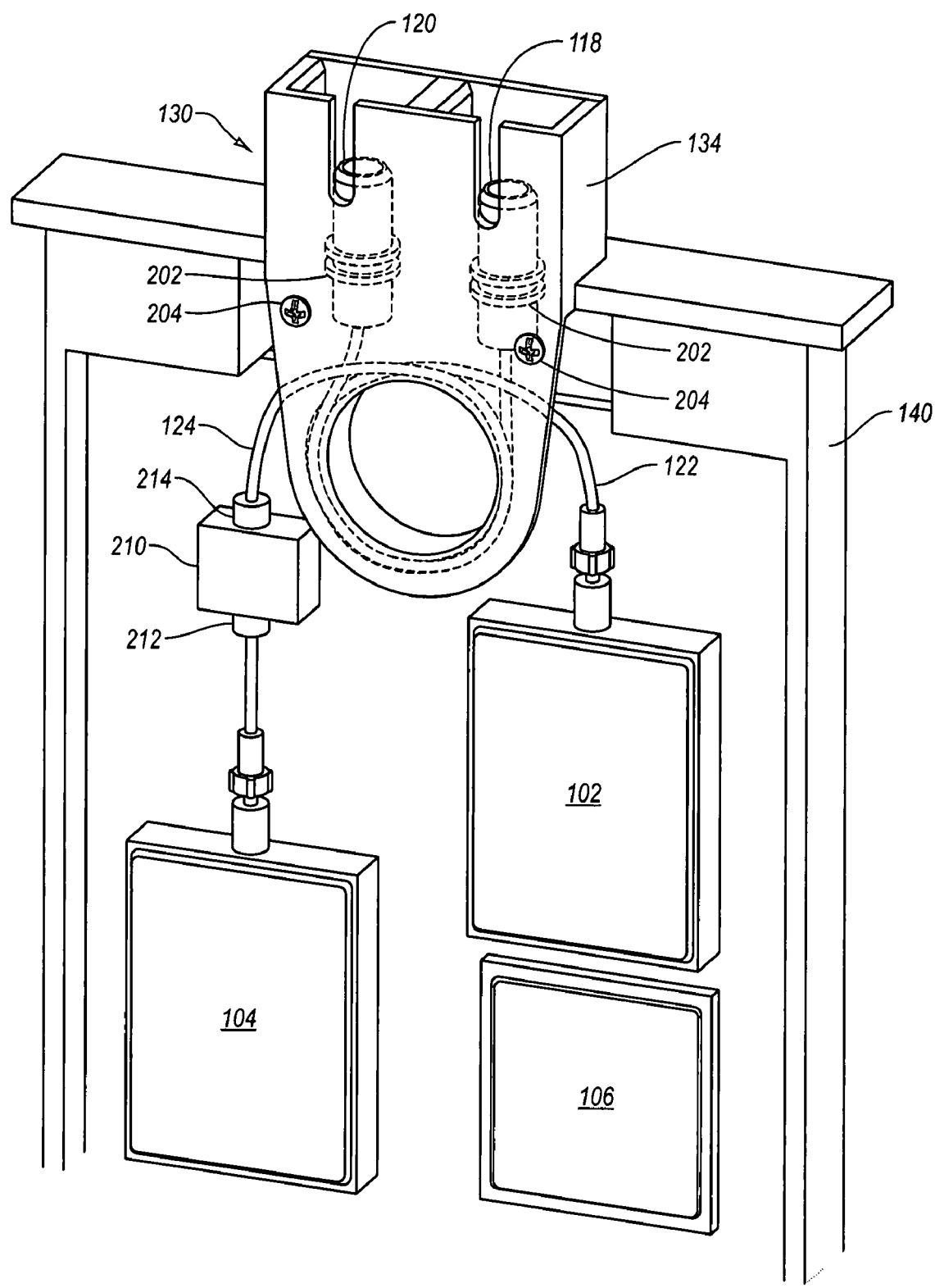
FIG. 2 illustrates a perspective view of one embodiment of a connector assembly included in the optical component of FIG. 1.

FIG. 2 illustrates a perspective view of the connection assembly 130. In this case, the housing 140 of the module is configured to receive the connection assembly 130. The connection assembly 130 can be secured to the housing 130 or to another component of the module 100, such as the PCB 126. As illustrated, the spool assembly 116 is inside of the module while the receptacles 118 and 120 are positioned within the receptacle holders 134 to receive external optical connectors. The spool assembly 116 may be secured to the module via screws 204 (or other suitable connectors). In one example, the screws 204 secure the connection assembly 130 to the housing 140 of the module 100. The screws 204 can fix the position of the receptacles 118 and 120 such that repeated insertions of optical components do not damage the fibers 122 and 124. The connection assembly 130 may also be connected a press fit or other means. The connection assembly 130 may alternatively be connected to a top cover of the housing. By connecting the connection assembly 130 to the top portion of the housing, it may be possible to free additional space on the PCB for components such as integrated circuits and the like on the space that would otherwise be occupied by the spool assembly. More specifically, the spool assembly 16 can be formed to have a thickness that is less that the available space inside the module and yet be sufficient to allow the fibers to be spooled.

FIG. 2 further illustrates that the receptacle holder 134 is integrated with the spooling assembly 116 in one embodiment. The spooling assembly 116 provides fiber management within the module 100. For instance, the spooling assembly 116 provides a place for the fiber to be placed and ensure that the fiber connection from inside the module 100 to an external fiber is properly maintained. For example, without the spool assembly, it may be possible for the fiber to bend past the bend radius, resulting in lost light and poor performance. The spooled fiber on the spooling assembly 116 also provides the play in the fiber that may be necessary to detach the fiber assembly from the ROSA or TOSA.

By integrating the receptacle holders 134 with the spooling assembly 116, an attachment point for the optics (such as external optical fibers) is provided, a securing point from the fiber is provided, and an attachment point for the PCB is also provided. One or more of these points is typically used. For instance, the fiber assembly is often fragile. An integrated connector assembly secures the receptacle or the port to the PCB or to the housing. The fiber is thus secured and the stress of external forces on the fiber is substantially reduced. Further, the spooling assembly provides routing for the fiber, providing additional fiber management inside of the module.

FIG. 2 further illustrates another aspect of the invention in that additional optical components can be connected in series or in other fashions. The component 210, for example, can be secured in line between the component 104 and the receptacle 120. The component 210 can be an optical isolator, a polarizer or other passive component. The component 210 could also be an active component in some instances, such as an external modulator and the like.

In one example, the fiber assembly has the optical component 210 integrated. This enables a user to swap one fiber assembly that does not have the component 210 with a fiber assembly that includes the component 210. If the component 210 is connected with the PCB 126 via a BGA, then the fiber may also connect using modified connectors 214. This enables the components 210 to be swapped out with less likelihood of damaging the connected fibers. Also, additional fiber spooling may be provided using the existing spooling assembly in order to provide fiber management. Additional spooling is not required, however. Spooling in fact is not required. Rather, the fiber can be managed in another manner. In one example, the fiber assemblies can directly connect to the various modules without being spooled. Thus, the spooling assembly can be omitted.

Figure 3:
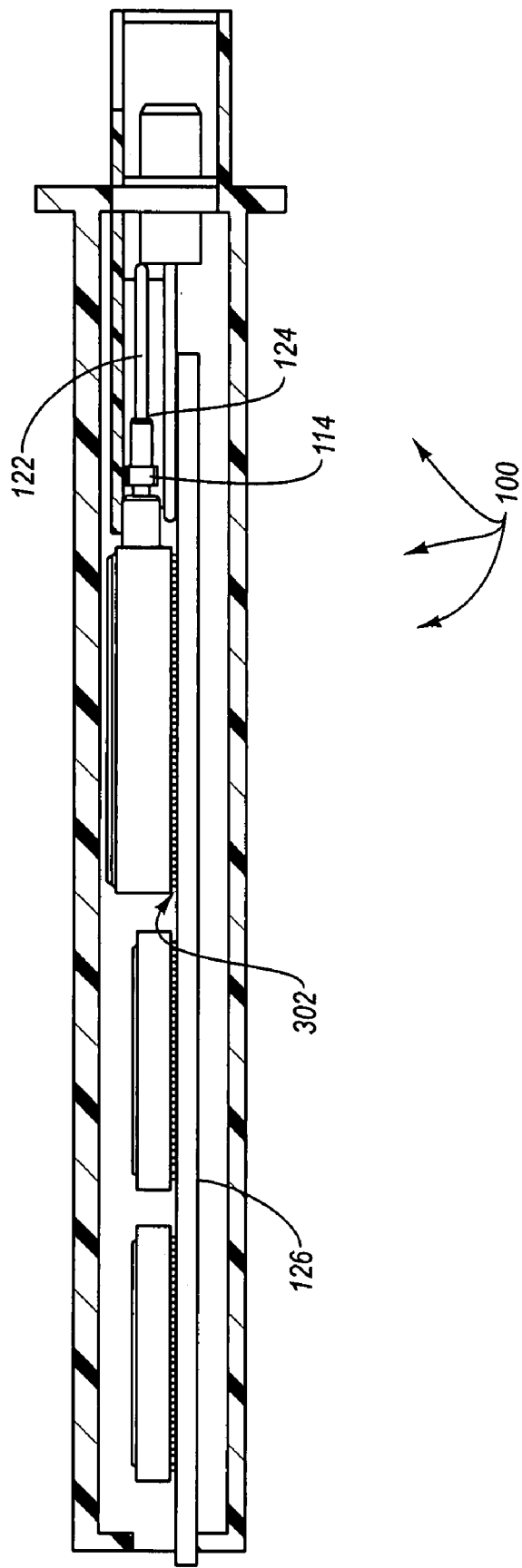
FIG. 3 illustrates a side view of one embodiment of an optical module including the housing and illustrates a fiber of the fiber assembly spooled around the spooling assembly, which spooling assembly is disposed within the housing of the module in one embodiment.

FIG. 3 presents a side view of one embodiment of the module 100. FIG. 3 illustrates that the fibers 122 and 124 are wrapped around the spool assembly and then connected internal to the housing 140 via the modified connector 114 to an optical component, such as the ROSA 104 for example. FIG. 3 also illustrates the BGA connection between the components of the module 100 and the printed circuit board 126. A BGA connection, such as the connection 302, often includes small solder balls that are flowed using heat. As they cool, a connection is formed between the traces on the high speed PCB 126 and the component. As previously indicated, the components can be removed by reflowing the solder and extracting the component. This process can be repeated as necessary. Thus, individual components can be removed and replaced without interfering with other components of the module 100.

A BGA component enables many more connections (higher density) compared to other types of connectors. In a BGA component, solder balls are typically placed on a component (such as the components illustrated in FIGS. 1-3). The PCB typically has pads that are arranged to match up with the solder balls. During attachment, heat is applied to cause the solder balls to flow. As a result, an electrical and mechanical connection is established between the component and the PCB.

This type of BGA connection has several aspects that facilitate high speed connections. For example, the BGA arrangement such as illustrated at 302 in a side view, provides high connection density. As signal density increases in conventional pin grids or surface mount pin packages, the distance between pins caused difficulties during the soldering process. A BGA connection, in contrast, has the proper amount of solder applied prior to reflow. As a result, the connections between the component and the PCB are easier to achieve. Further, BGAs can achieve lower thermal resistance, which allows heat to more easily flow and dissipate, thereby reducing the likelihood of an IC overheating. Also, BGA connections tend to be short. This lowers the associated inductance, which is problematic at higher speeds. Thus, the high speed performance of the module can improve using BGA connections.

Advantageously, the ability to provide a high density of connections with reduced inductance facilitates the introduction of higher speeds in an optical module such as a transceiver or a transponder. Further, mounting a component using a solder ball array or by flip chip bonding can reduce the space requirements compared to conventional pin bonding methods. Reducing the height of the module by using a BGA, for example and reducing the surface area required (pins extending out from module no required) for a particular component can allow, for example, the inclusion of additional components or modules.

Figure 4:
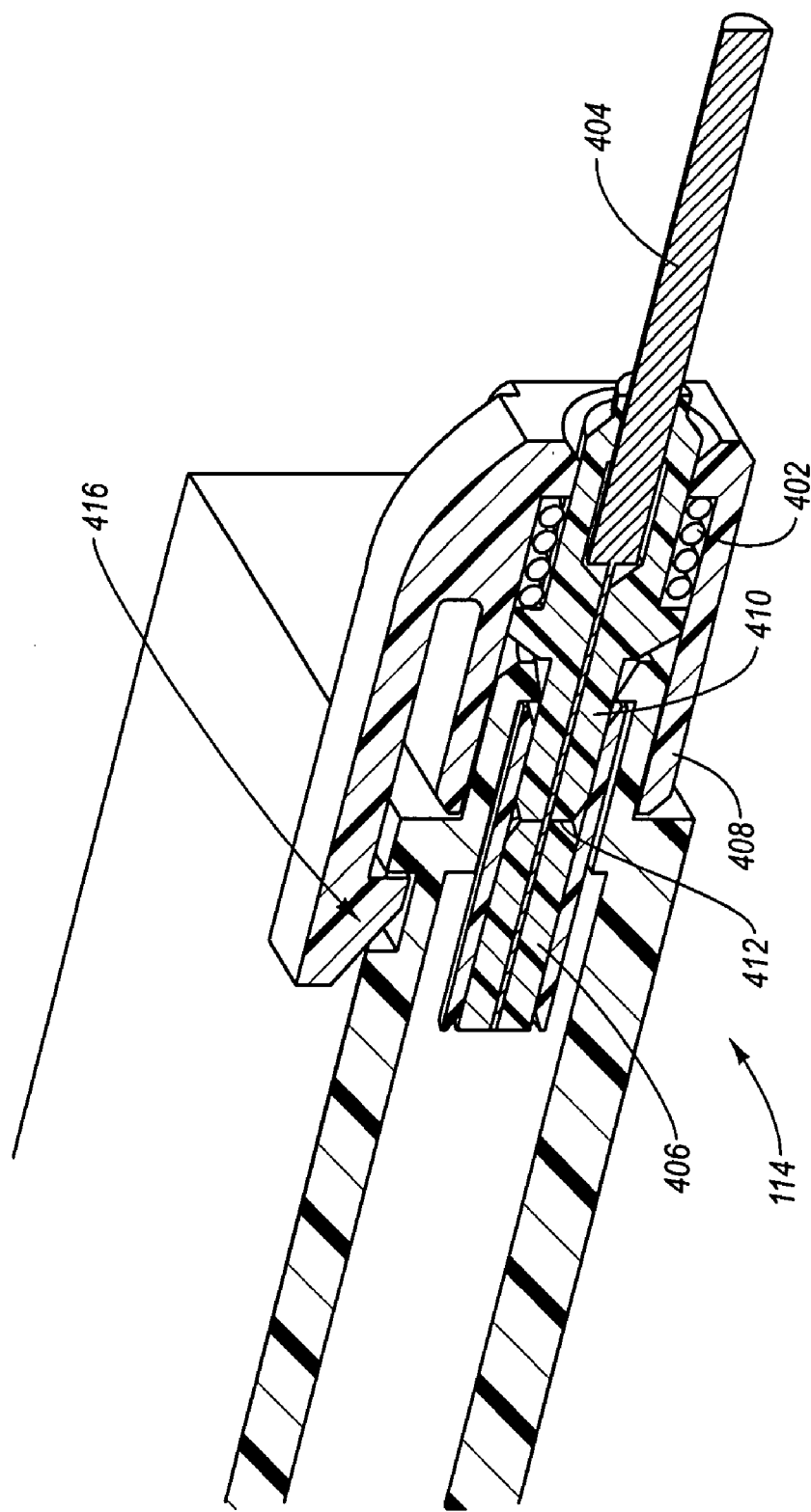
FIG. 4 illustrates a cut away view of one embodiment of a modified connector used internally to the optical module illustrated in FIG. 1, wherein the modified connector has dimensions such that the modified connector can be entirely disposed within an optical module of FIG. 1.
Figure 5:
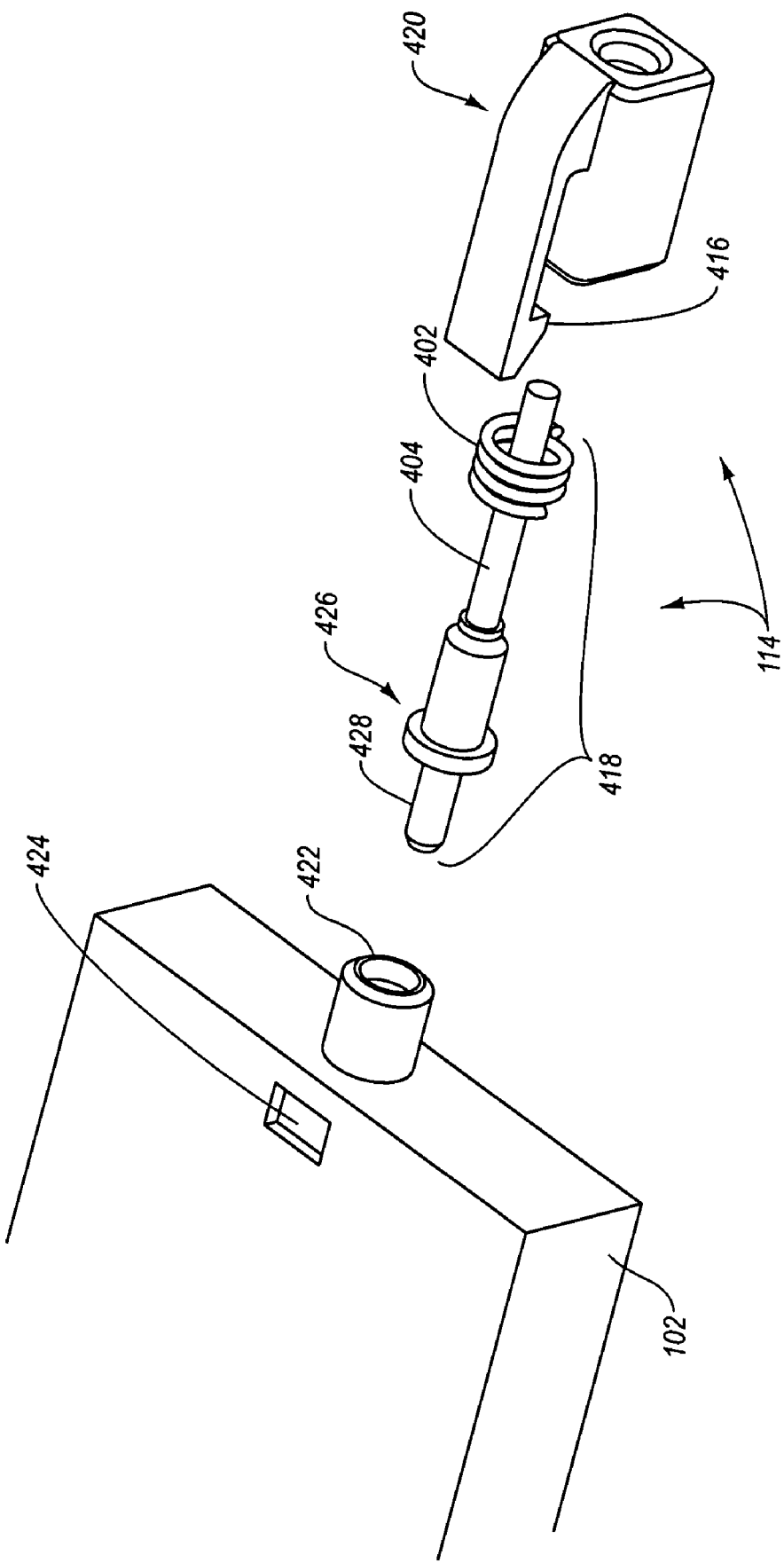
FIG. 5 illustrates an expanded perspective view of a connector illustrated in FIG. 4.

FIGS. 4 and 5 illustrate one embodiment of a modified connector 114. The connector 114 is modified in one sense, by way of example only, that it is typically smaller that a conventional LC or SC connector because it is inside of a module 114. Typically, the size of a conventional LC or SC connector preclude their use inside of optical modules. The size is reduced in order to accommodate the limited space inside the modules. For example, some optical modules have size constraints that are specified by various standards. As a result, the size of the connector 114 is altered to conform with these constraints.

In this example, the connector 114 includes a jumper assembly 418 and a connector shell 420. The jumper assembly 418 typically includes a ferrule 426 that is connected on one end of the fiber 404. A spring 402 (or other retention structure) is also included in the jumper assembly 418 to retain the connector 114 in position once connected. The ferrule 426 is typically secured to the fiber 404 and does not move relative to the fiber 404. Thus, the spring 402 can hold the connector 114 in the proper position.

The component 102 has a port 422 sized and configured to receive the fiber stub 428. When properly inserted, the fiber stub 428 is positioned adjacent the fiber 406 such that light couples into the fiber 404 from the fiber 406, or vice versa—depending on whether the module 102 is receiving or transmitting light.

The connector shell 420 of the connector 114 includes a clip 416 and the shell 420 is disposed around the fiber 404. When the connector 114 is inserted into the port 422, the clip 416 engages with an indentation 424 formed in the component 102. When the clip 406 engages with the indentation 424, the spring 402 is at least partially compressed and pushes against the connector shell 420 and against the component 102. In this manner, the connector 114 is securely held in an inserted position in the port 422. The connector 114 can be easily removed by simply lifting the clip 406 such that the clip is no longer engaged with the indentation 424. The connector 114 can then be removed by sliding the fiber out.

As previously described, once the fiber 404 is removed, the component 102 can be removed and replaced from the module as previously described. In other words, the component 102 can be changed-out if desired without damaging the fiber assembly.

Figure 6:
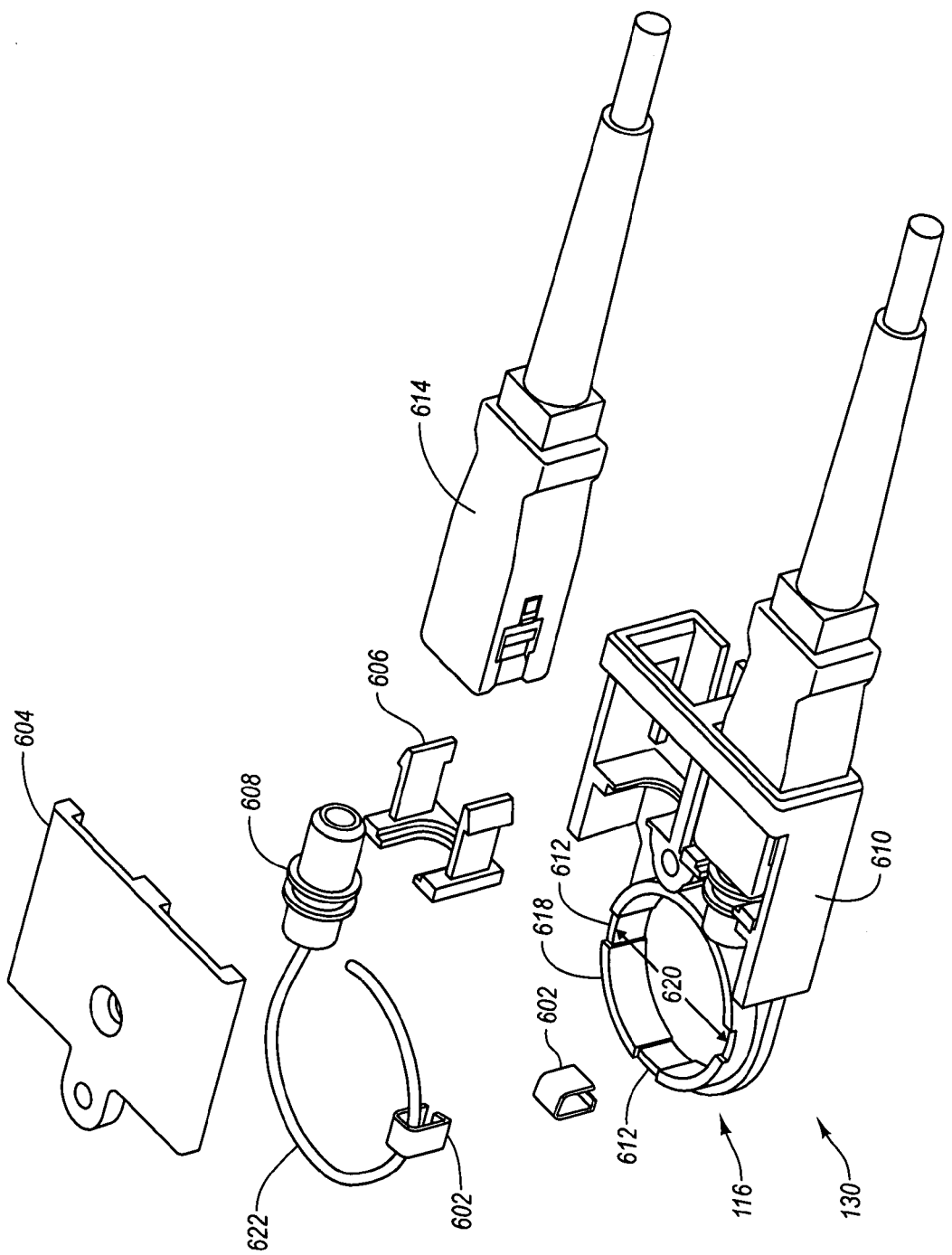
FIG. 6 illustrates an expanded perspective view of a connection assembly included in one embodiment of an optical module and illustrates a spooling assembly that permits fiber to be spooled internally to the optical module.

FIG. 6 illustrates an exploded perspective view of a connector assembly 130 that is used to form the ports of the module. The connector assembly 130 includes a receptacle holder 610. The receptacle holder 610 is typically capable of receiving two connectors such as the SC connector 614 or other type of connector. Additionally, the receptacle holder 610 can be adapted to accommodate multiple connectors. Two connectors are typically accommodated because an optical module 100 may be an optical transceiver that includes both a transmitter and a receiver. The connector assembly 130 can be expanded to include more receptacle holders. The scalability of ports enabled by embodiments of the invention enable multiple transmitters and/or receivers to be inserted in any given module. In this case, one or more spool assemblies may be included to accommodate the number of anticipated ports and associated fiber assemblies.

The connector assembly 130 includes a connector clip 606. The clip 606 is positioned inside of the receptacle holder 610 and receives a receptacle 608. The receptacle 608 is designed for a particular type of connector. FIG. 6 illustrates an SC receptacle and an SC connector. The clip 606 holds the receptacle 608 in place relative to the housing of the module 100 such that the connector 614 can be repeatedly inserted/removed as needed. If necessary, the clip 606 may also provide some movement such that the receptacle 608 can self align with any connector that is being inserted.

The fiber 622 that is integrated with the receptacle 608 and a connector 114 as previously described is spooled around the spool assembly 116. One or more retention clips 602 can be used to hold the spooled fiber in place and prevent the spooled fiber from unwinding or unspooling unintentionally. The ridge 618 of the spool assembly 618 may include clip receptacles 612 that are configured to receive the retention clips 602 in a manner that secures the spooled fiber.

Once the fiber(s) have been spooled on the spool assembly 116 and secured with the retention clips 602, a cover 604 can be attached. The cover 604 may not cover the spool assembly 116, but may only cover the receptacles 610 and may connect with the receptacle holder 610. When assembled into a module such as the module 100, the spool assembly 116 remains inside the module and only the receptacles 608 remain accessible to external connectors 614. A connector such as a screw may be used to secure the cover 604 to the connection assembly and to the housing and/or to the PCB. The spool assembly may also be connected with the housing or the PCB as previously described.

The ridge 618 may have a diameter 620 that is configured to insure that the bend radius of the fiber 622 is maintained. In other words, the diameter of the ridge 618 ensures that the fiber 622 does not bend to the point that light is lost or poorly couples. Fiber with a 7.5 mm bend radius, for example, may be used to help minimize the space occupied by the spool assembly 116. Often, the spool assembly 116 is located behind the receptacle holders as illustrated herein. Advantageously, if the fiber is damaged, embodiments of the invention enable the fiber to be replaced without having to replace any other components. The diameter 620 can be made smaller to accommodate fiber with an appropriate bend radius. In other words, if the fiber is available, smaller assemblies can be made without sacrificing performance.

Figure 7:
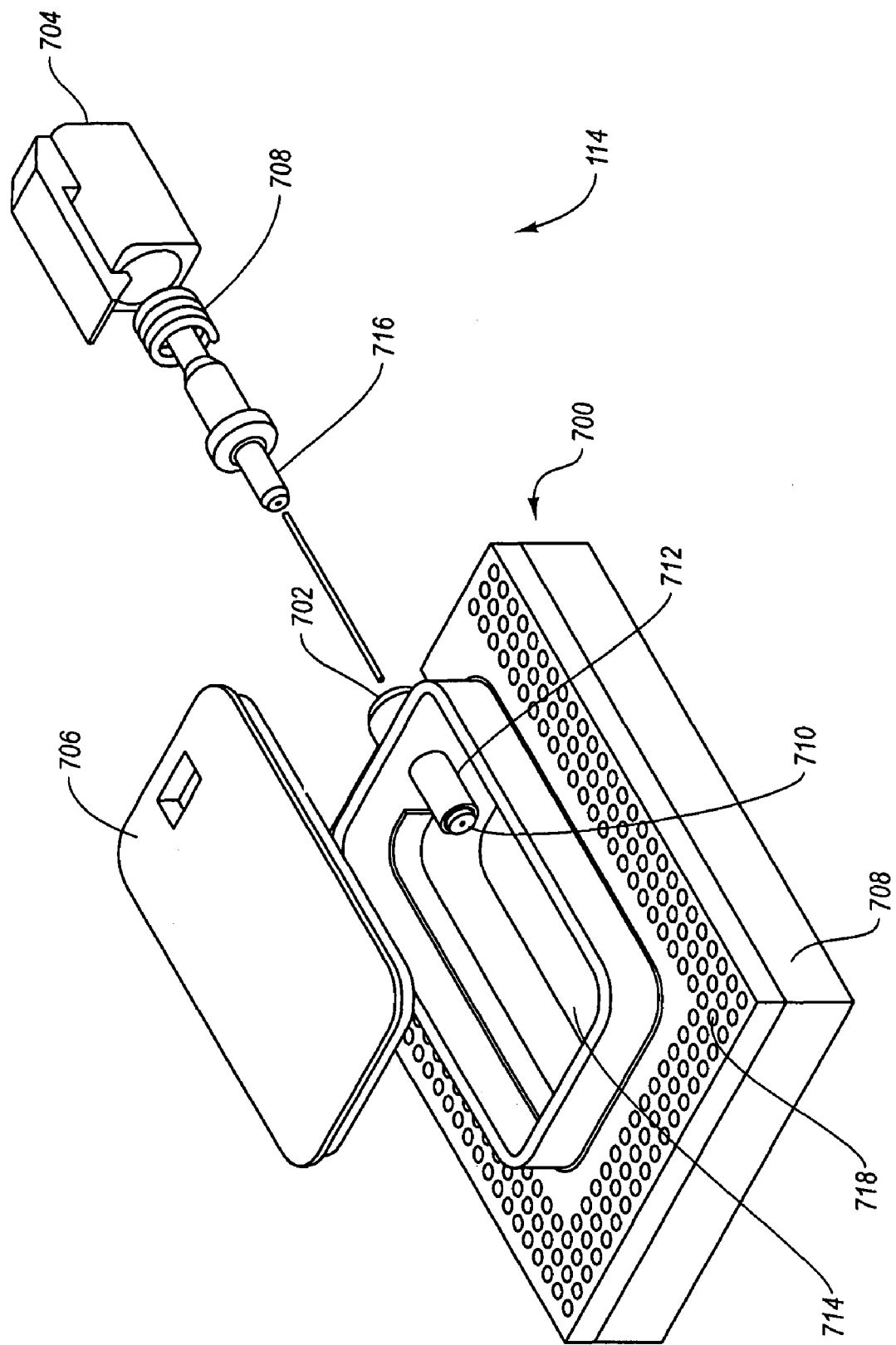
FIG. 7 illustrates an expanded perspective view of a component such as an optical sub-assembly that may be included in the optical module of FIG. 1.

FIG. 7 illustrates an expanded perspective view of a connector and a component such as an optical sub-assembly. In this example, the component 700 includes an optical assembly such as an optical transmitter (e.g., a laser diode) or an optical receiver (e.g., a photodiode). The component 700 includes a lid 706 that can be fitted with the component 700 and sealed if necessary, by welding, by pressure fit, and the like. The interior 714 is configured to accommodate an optical assembly as well as necessary connections to the BGA from the optical assembly.

The lid 706 and the component 700 can be formed also to reduce or to contain EMI emissions as well. The lid 706, for example, can be made of metal. The interior can also be formed of or plated with an EMI reducing, absorbing, and/or containing material. Other components can be similarly configured. As a result, EMI can be contained at the component level in addition to the EMI containment provided by the housing and or the cage within which the module is typically inserted.

Thus, this example of the component 700 also includes a BGA layout 718 (the connection is typically hidden but is illustrated in this example for ease of understanding) that can be connected with a corresponding layout on a high speed PCB board as previously described. In other words, the BGA is typically bonded to the PCB 708. The component 700 also includes a port 702 that provides an optical path between the inside the component to the outside of the component. Thus, an opening is formed in a wall of the housing of the component, and the port 702 is fixed therein. In this example, a split sleeve 712 and a fiber stub 712 are included as part of the port 702.

The connector 114 can detachably connect with the port 702. The ferrule 716 fits inside one end of the port 702 such that optical signals can be transmitted therethrough. The spring 718 and the shell 704 operate as previously described to hold the connector 114 in place during operation.

The interior 714 can accommodate various components. The interior 714 may include a laser diode, a photodiode or other component. Further any component disposed in the interior 714 may be connected to the BGA in any appropriate manner. This may include bond wires, another BGA arrangement, and the like or any combination thereof. Thus, embodiments of the invention contemplate a hierarchical BGA arrangement in some instances. The number of connections for a given component can vary. For example, a laser may required four or five connections—thus the size of the BGA can be substantially reduced. Of course, the BGA allows high density connections. Thus, embodiments of the invention also enable more connections to be provided to the laser or photodiode or other optical component. Advantageously, this may allow substantially more control functionality to be implemented on optical signals. Optical waveform shaping, signal emphasis, rise time, fall time, threshold current, current modulation, eye control, various monitoring controls, and the like are examples of controls or signals that may be present. One of skill in the art can appreciate that other signals or different combinations may be implemented in various embodiments. Alternatively, the BGA for a controller may be substantially greater owing to the number of control lines and data connections.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of packaging a high density optical module, the optical module having at least one of a receiving optical assembly and a transmitting optical assembly, the method comprising:

connecting a first detachable fiber assembly to an optical component disposed in the module such that the connection between the fiber assembly and the optical component is disposed inside a housing of the optical module, the fiber assembly including a receptacle, a fiber, and a modified connector, and the optical component comprising one of a TOSA, a ROSA, a laser, a photodiode, an optical isolator, or a polarizer;

spooling the fiber included in the fiber assembly around a spooling assembly;

securing the receptacle in a receptacle holder such that the receptacle is able to connect with an external fiber connector;

detaching the fiber assembly from the optical component; and heating the optical component such that a ball grid array connection, that connects the optical component to a high speed printed circuit board, flows such that the optical component can be removed from the high speed printed circuit board without damaging the fiber assembly.

2. The method according to claim 1, wherein the spooling assembly and the receptacle holder are integrated as a connection assembly.

3. The method according to claim 2 wherein the connection assembly is detachable from the housing.

4. The method according to claim 1 wherein the optical module includes an integrated circuit, the integrated circuit having a ball grid array for connection with the high speed printed circuit board.

5. The method according to claim 1, further comprising:

replacing the optical component with a second optical component; and connecting the fiber assembly to the second optical component.

6. The method according to claim 1 wherein the receptacle is an SC or LC receptacle.

7. The method according to claim 1 wherein the fiber has a bend radius of 7.5 mm or less.

* * * * *